United States Patent [19]
Hannon et al.

[11] Patent Number: 5,815,570
[45] Date of Patent: Sep. 29, 1998

[54] COMMUNICATION DEVICE WITH CARD EJECTION MECHANISM

[75] Inventors: John Francis Hannon, Gurnee; Frank John Annerino, Rolling Meadows, both of Ill.

[73] Assignee: Motorola, Inc., Schaumburg, Ill.

[21] Appl. No.: 536,538

[22] Filed: Sep. 29, 1995

[51] Int. Cl.⁶ .............................. H04M 1/00; H04B 1/00; H04B 1/38
[52] U.S. Cl. .................. 379/428; 379/428; 379/429; 379/433; 455/61; 455/90
[58] Field of Search .................................. 379/428, 429, 379/433; 455/90, 61

[56] References Cited

U.S. PATENT DOCUMENTS

| | | | |
|---|---|---|---|
| 4,236,667 | 12/1980 | Crowley et al. | 235/443 |
| 4,899,035 | 2/1990 | Goldmann et al. | 235/441 |
| 4,926,032 | 5/1990 | Shimamura et al. | 235/441 |
| 5,012,078 | 4/1991 | Pernet | 235/441 |
| 5,055,970 | 10/1991 | Weihs | 361/754 |
| 5,257,414 | 10/1993 | Trahan et al. | 455/90 |
| 5,325,429 | 6/1994 | Kurgan | 379/429 |
| 5,436,969 | 7/1995 | Kobayashi | 379/433 |

FOREIGN PATENT DOCUMENTS

| | | |
|---|---|---|
| 0214478 | 8/1986 | European Pat. Off. . |
| 0254316 | 7/1987 | European Pat. Off. . |
| 0282296 | 3/1988 | European Pat. Off. . |
| 0316700 | 11/1988 | European Pat. Off. . |
| 0338900 | 4/1989 | European Pat. Off. . |
| 0351103 | 6/1989 | European Pat. Off. . |
| 0476892 | 9/1991 | European Pat. Off. . |
| 0480334 | 10/1991 | European Pat. Off. . |
| 2587549 | 9/1985 | France . |
| 38338677 | 5/1990 | Germany . |

OTHER PUBLICATIONS

ITT ElectroMechanical Components Worldwide Brochure containing their range of SmartCard Connectors. This brochure describes the available range of smart card connectors from ITT.

Amphenol Industrial Technology Division Brochure containing various chip card readers.

Amphenol Industrial Technology Division Catalog containing Amphenol's range of chip card readers.

*Primary Examiner*—Fan S. Tsang
*Assistant Examiner*—Allan Hoosain
*Attorney, Agent, or Firm*—Randall S. Vaas

[57] ABSTRACT

A communication device includes a housing (102), the housing has an opening (107) for receipt of a card having information stored therein. A card reader element (308) is positioned in the housing to communicate information from the card (108) to circuitry in the housing. A low profile ejection mechanism (402) is positioned on the housing. The ejection mechanism includes a spring (614) extending outwardly from the body toward the card reader element to push the card against the card reader element.

14 Claims, 4 Drawing Sheets

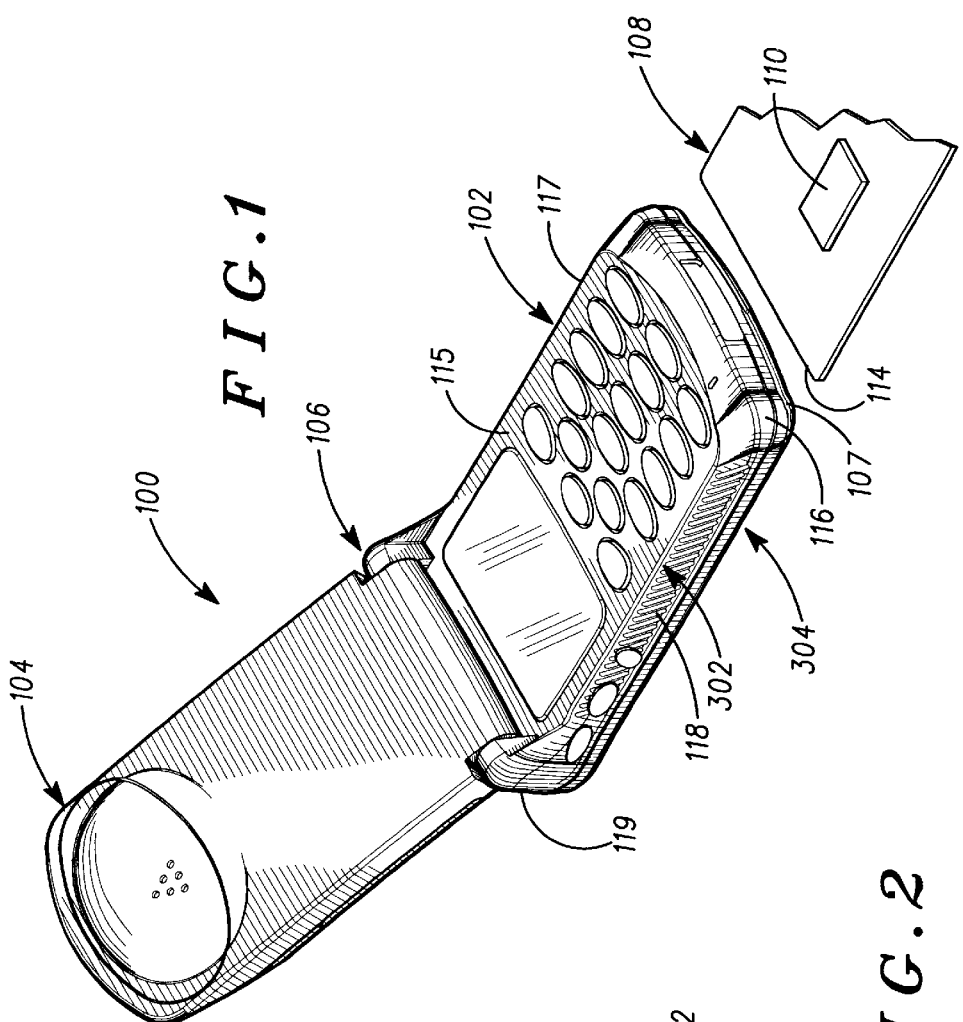
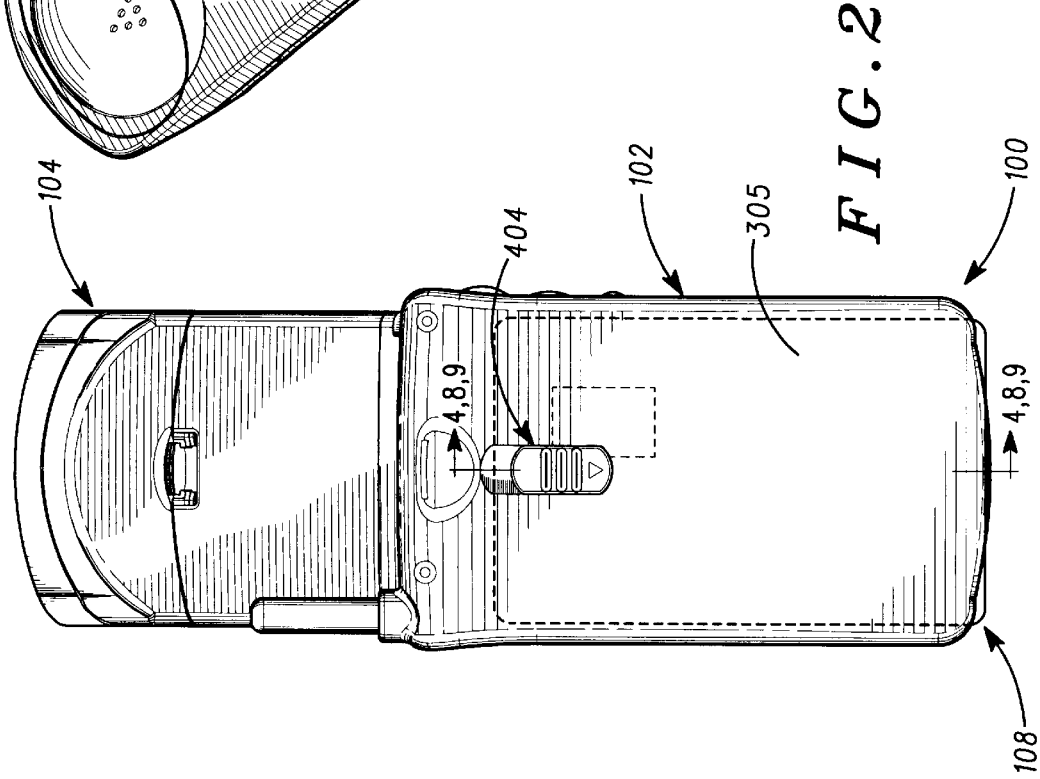

5,815,570

COMMUNICATION DEVICE WITH CARD EJECTION MECHANISM

FIELD OF THE INVENTION

The present invention pertains to communication devices, and more particularly to communication devices including ejection mechanisms for card shaped devices.

BACKGROUND OF THE INVENTION

A variety of communication devices are known which use a removable card having information stored therein. Such devices include radios, radiotelephones, bank automated teller machines, electronic payment collection equipment, and the like. The cards are used by the device for security, telephone billing, banking, cinemas, and mass transportation charges.

Typically these devices have an opening in the form of a slot, a pocket, or a recess, that receives the card. A card reader element communicates with a card received therein. The card reader element employed depends upon the type of card to be used. Contacts are used with cards including an integrated circuit such as a memory to a microprocessor. The contacts are coupled to a processor that reads from, and write to, the integrated circuit. Magnetic transducers are used with cards having a magnetic storage element, such as a strip. the magnetic transducers read from and write to the magnetic storage element.

Regardless of the type of card reader element employed, it is necessary that the card make reliable contact with the reader element. Because these cards may warp with age, it is further desirable that the card be received into a slot in the device. The sides of the slot can guide the card to a desired position and bend a warped card to a flat configuration for reading. However, because the card is received into the housing, the user must be able to remove the card easily.

It has become particularly challenging to implement an effective ejection mechanism for card readers as devices become increasingly smaller. This is particularly true for portable devices that are not much bigger than the cards. Restrictions in the dimensions of these devices necessitates dense packing of integrated circuits on limited surface areas of small circuit boards. This dense packaging in turn limits the room available for mounting an ejection mechanism.

BRIEF DESCRIPTION OF THE DRAWINGS

FIG. 1 is a front, left side and bottom view of a radiotelephone;

FIG. 2 is a back view of the radiotelephone according to FIG. 1;

DETAILED DESCRIPTION OF THE PREFERRED EMBODIMENTS

Figure 3:
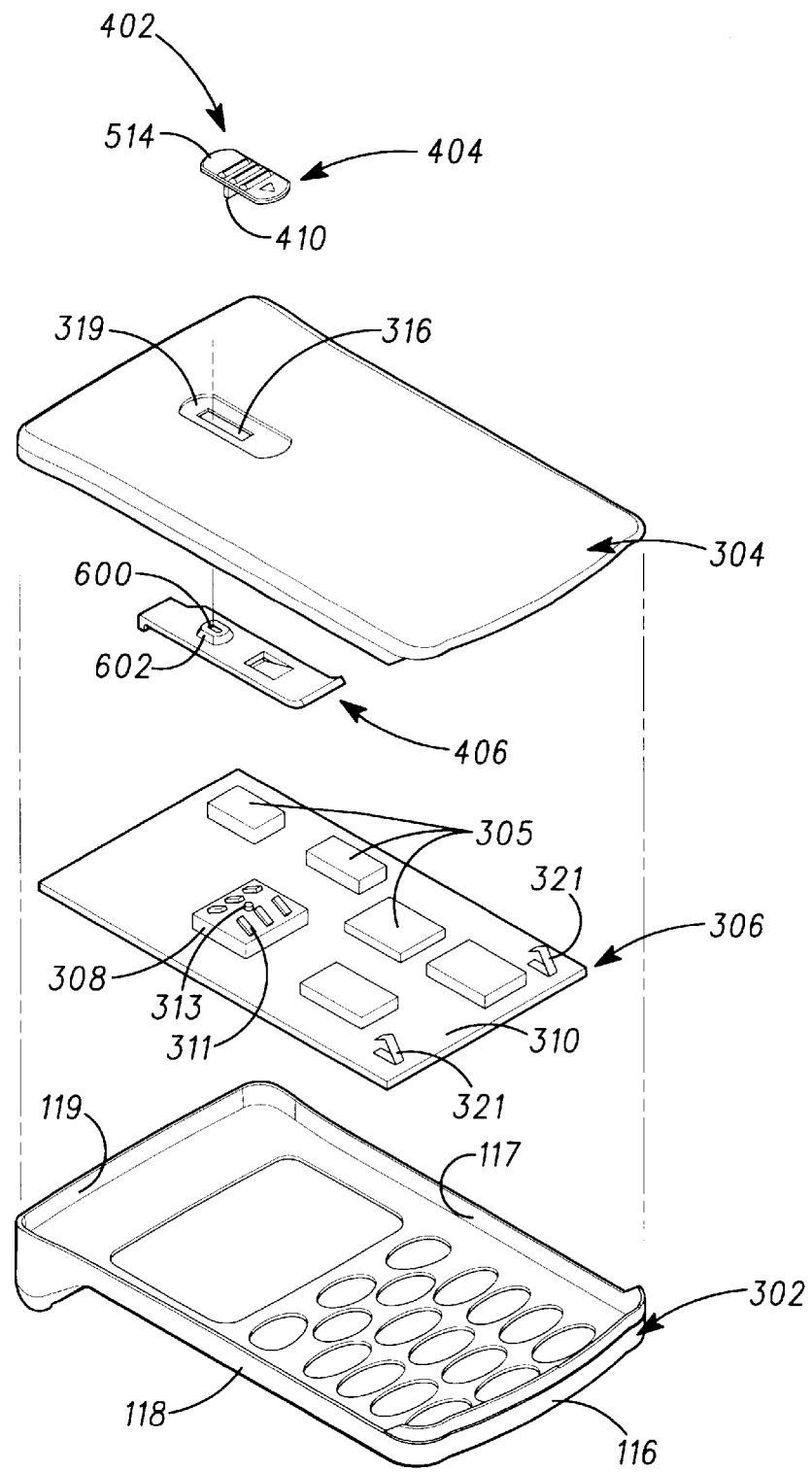
FIG. 3 is an exploded perspective view of one section of the housing for the radiotelephone according to FIG. 1.

A communication device includes a housing, the housing has an opening for receipt of a card having information stored therein. A card reader is positioned in the housing. The card reader includes an element to communicate information from the card to circuitry in the housing. A low profile ejection mechanism is positioned on the housing.

The ejection mechanism includes a grip, a body coupled to the grip, and a spring extending outwardly from the body toward the card reader to push the card against the card reader.

The communication device is illustrated as a radiotelephone 100 (FIG. 1) in the drawings. The radiotelephone 100 has a first housing 102 and a second housing 104 which are interconnected by a hinge assembly 106. The first housing includes a front wall 115, a side wall 118, a side wall 117, a bottom wall 116, a top wall 119, and a back wall 305. Those skilled in the art will recognize that although the present invention is illustrated in this communication device, in which it is particularly advantageous, it may be also employed in other radiotelephones, cordless telephones, radios, pagers, and the like. Accordingly, as used herein, "device" shall include all of these and their equivalents.

The first housing 102 of radiotelephone 100 includes a slot, or opening, 107 for receipt of a card 108. The card may be a subscriber identity module (SIM) card, a memory card, or another card device. The card 108 illustrated is a SIM card including a generally planar, rectangular, polymer body 109 and an integrated circuit 110 mounted in the body. The integrated circuit includes a microprocessor, as is well known. Inasmuch as SIM cards are commercially available, they will not be described in greater detail herein for brevity. Card 108 is illustrated fully inserted into housing 102 in FIG. 2.

Housing 102 includes a front housing section 302 (FIG. 3) and a back housing section 304. A circuit board assembly 306 including radio frequency (RF) circuitry 309 is positioned between the front and back housing sections when the radiotelephone 100 is fully assembled. A SIM card reader element 308 is mounted to a circuit board 310 of the printed circuit board assembly 306 by suitable conventional means. The SIM card reader element 308 includes contacts 311 projecting outwardly therefrom for electrical connection to contacts (not shown) on the integrated circuit 110 (FIG. 1) in SIM card 108. The card reader element also includes a presence switch contact 313. The card reader element 308 is implemented using a conventional card reader for SIM cards, a magnetic strip reader, an optical device, or any other suitable element required for the type of card to be employed with the device. Accordingly, as used herein, "card reader element" refers to all such card reading transducers and their equivalents.

Ramps 321 (FIG. 3) are provided on an end of the circuit board assembly 306 adjacent opening 107. The ramps guide a card 108 (shown in FIG. 1) to a position above the elements of circuitry 309. The ramps are of any suitable construction such as clips stamped from metal, molded from plastic, or the like. Although not illustrated, a plastic sheet, substantially as wide as the circuit board assembly 306, can be folded around the end of circuit board assembly 306 such that it extends over circuitry 309 and up to, or around, the card reader element 308. The card 108 then slides over the plastic sheet instead of circuitry 309.

Figure 4:
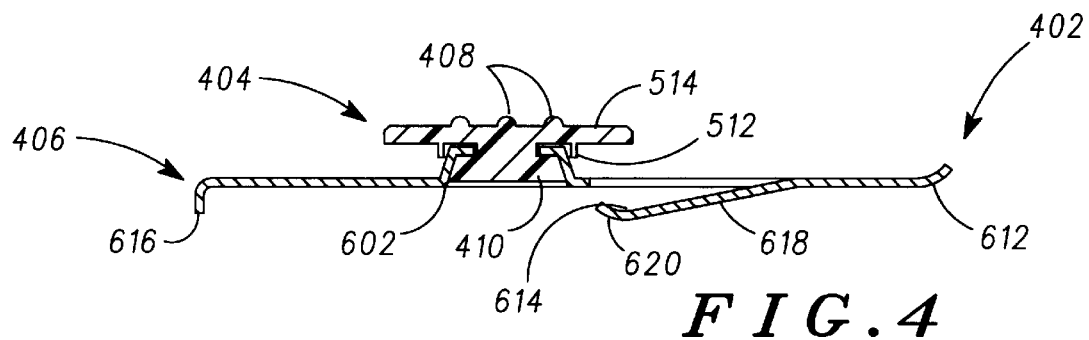
FIG. 4 is a cross-sectional view of an ejection mechanism taken along plane IV—IV in FIG. 2.
Figure 5:
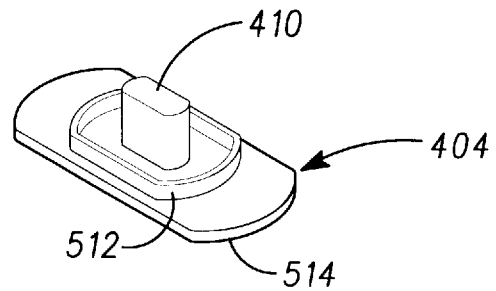
FIG. 5 is a bottom perspective view of a button of the ejection mechanism according to FIG. 4.

An ejection mechanism 402 (FIG. 4) is provided for removing card 108 (FIG. 1) from opening 107. The ejection mechanism includes a button 404 and a clip 406. The button 404 includes upstanding ribs 408 and a downwardly extending post 410. As can best be seen in FIG. 5, the bottom of the button includes a well wall 512 circumscribing a moat around the base of post 410. The button is of a suitable polymeric manufacture, such as integrally molded of an organic polymer.

Figure 6:
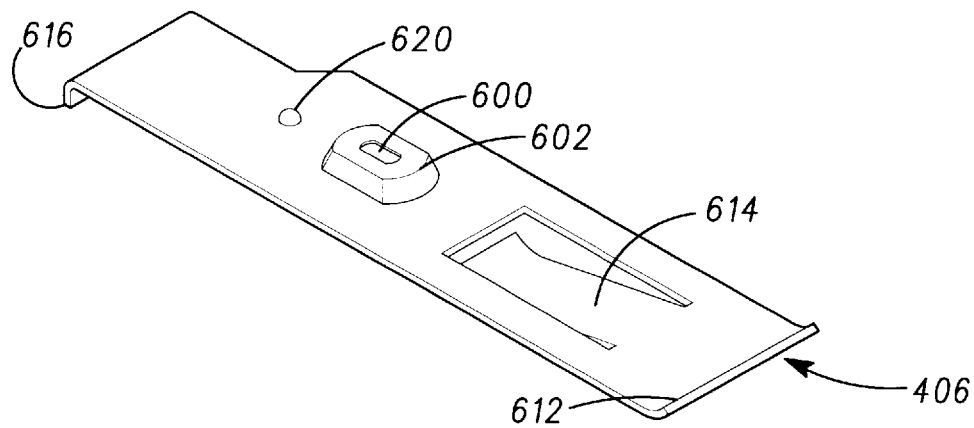
FIG. 6 is a top perspective view of a clip of the ejection mechanism according to FIG. 4.
Figure 7:
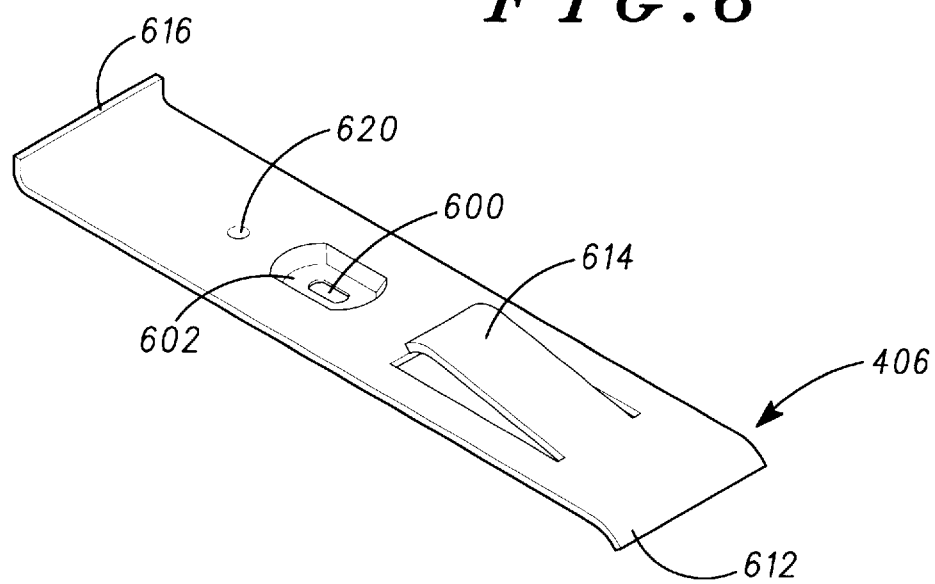
FIG. 7 is a bottom perspective view of the clip according to FIG. 6.

The clip 406 includes a central opening 600 (FIGS. 6 and 7) in a bowl 602. The central opening 600 receives post 410 prior to heat staking and the bowl 602 receives the melted post after heat staking while to attach the clip to the button. The clip 406 also includes an integral guide 612, a spring 614, and a stop member 616. The spring 614 has a relatively flat body 618 and a curved end 626 that slides over the card surface. The spring is resilient, such that it returns to its original position after being deflected by a card. The clip 406 is of any suitable construction, such as a sheet metal member, and can be stamped from a resilient, durable, metal.

The clip 406 (FIG. 6) may include a dimple 620 to engage recesses 804 (FIGS. 8 and 9) in the back wall 305 of the rear housing section 304. When the ejection mechanism 402 is in the position illustrated in FIG. 8, the dimple is engaged in one of the recesses 804. When the card is in the partially ejected by the card ejection mechanism as illustrated in FIG. 9, the dimple is engaged in the other of the recesses 804. The dimple 620 and the recesses 804 thus provide indexing through positive feedback at desired positions of the ejection mechanism.

With reference to FIG. 3, the ejection mechanism 402 is mounted to the rear housing section 304. To mount the ejection mechanism, the post 410 and well wall 512 are inserted into slot 316. The body 514 of the button is received in a well 319 on the back wall 305. The rectangular post is received into the opening 600 of clip 406. The post is then melted into the bowl 602 of clip 406, such that it fills in the bowl and stays within the volume thereof. When the plastic is cooled, it is hard and fills in the bowl. This ensures a constant gap between the ejection mechanism parts and around the captivated rear housing, and prevents catching of the card on the ejection mechanism during insertion and extraction of the card.

Figure 8:
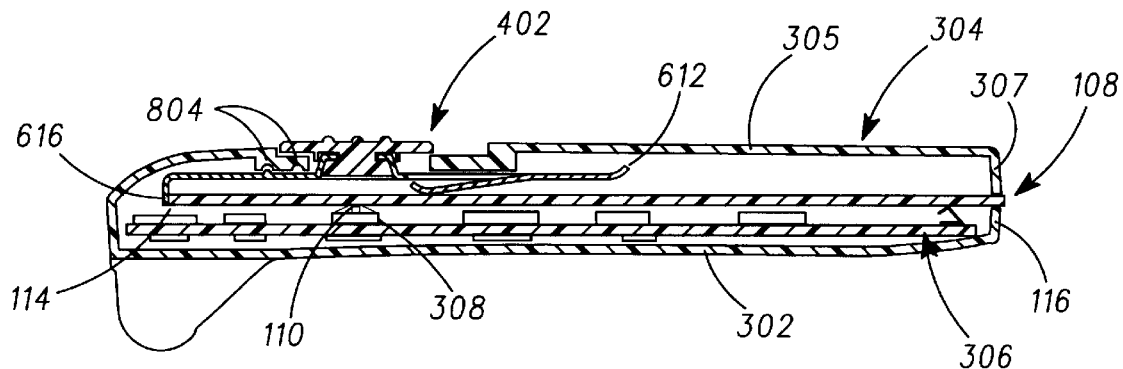
FIG. 8 is a cross-sectional view, taken along the same plane as FIG. 4, and including a card in the radiotelephone.
Figure 9:
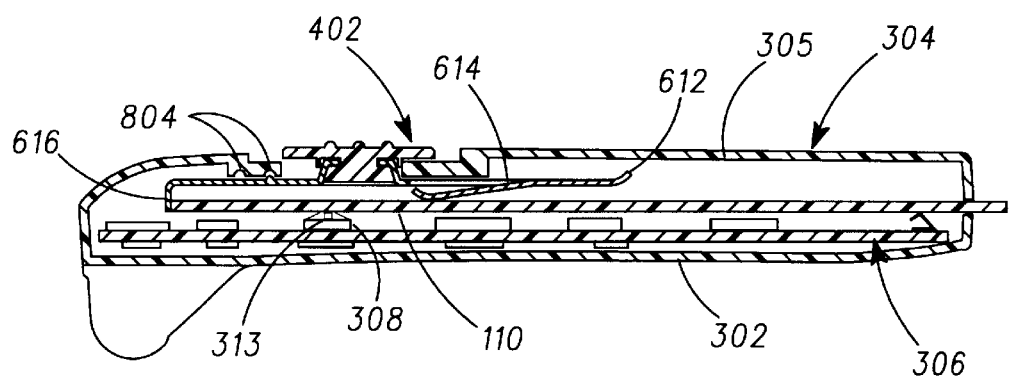
FIG. 9 is a cross-sectional view, taken along the same plane as FIG. 7, without a card partially ejected from the radiotelephone.

With reference to FIGS. 8 and 9, in operation the card 108 is inserted into opening, or slot, 107. The card will slide over ramps 321 and then between the back wall 305 of the rear housing section 304 and the integrated circuits on the printed circuit board assembly 306. The guide slopes upwardly to guide the card below the clip, thus preventing the card from becoming lodged between the clip 406 and the back wall 305. End 114 of card 108 will slide down guide 612 and up to spring 614. The spring 614 presses the card downwardly against card reader element 308. Spring 614 creates a force of approximately 400–500 grams pushing card 108 away from clip 406 such that card 108 is held firmly against the card reader element 308. This insures that the integrated circuit in the card makes a reliable contact with contacts 311 and 313 on the card reader element 308. The card will continue to move inwardly until end 114 abuts with stop member 616 and ejection mechanism 402 is at the end of slot 316. The stop member 616 engages an end of the card 108 when it is fully inserted, as is shown in FIG. 8, positioning the integrated circuit 110 on the card reader element 308. The integrated circuit 110 is thus positioned against card reader element 308 to facilitate communication between the integrated circuit 110 and the circuitry on printed circuit board assembly 306. This allows information, such as the subscribers identity or a dollar amount, to be downloaded from the card 108 to radiotelephone 100. The radiotelephone 100 can then use this information to communicate with a fixed site (not shown) using RF circuitry 309.

The card is ejected by pressing the button 404 to the opposite end of slot 316, which position is illustrated in FIG. 9. The upstanding ribs help the user's finger to grip the ejection mechanism 402 while it slides. When moved to the far end of the slot, the card projects well past bottom wall 116 of housing 102. The user can thus easily grab card 108 and pull it out of the radiotelephone.

During ejection of the card, the surrounding well wall 512 transfers the force applied to the button 404 directly to the clip 406. This eliminates stress that would otherwise occur on the heat staked shaft connection. The only force exerted on the heat staked elements is along the longitudinal axis of the post 410, as required to hold the clip 406 to the button 404 with the housing located between. The interlocking protrusion and well of the two ejection mechanism components prevent rotation of the clip 406 and button 404 relative to each other. The button may follow the curvature of the housing while the clip follows the plane of the circuit board assembly. Thus, the thickness of the two components and the housing may very along the length of the button. This heat staking method producing a low profile ejection mechanism on the rear housing section 304. The internal components of the ejection mechanism 402 are not readily visible from the exterior of the housing when the card is removed because the ejection mechanism is located well within the housing and has a low profile.

It can thus be seen that the card slot and ejection mechanism according to the present invention have a low profile. Accordingly it can be added to the radiotelephone without significantly effecting the size and weight of the device. This is particularly advantageous as it is highly desirable to provide small electronic devices which are light in weight. This low profile is accomplished without effecting the width of the button, such that the ejection mechanism button is relatively large making it easy for the user to grip and manipulate. Because the ejection mechanism is centrally located on the back housing, and is relatively wide, it pushes the card straight out without significant twisting of the card. This provides a smooth ejection of the card. Additionally, the ejection mechanism mounted on the back housing does not interfere with the space requirement for the integrated circuit board, as is the case with side wall mounted ejection mechanisms.

We claim:

1. A communication device, comprising:

a circuit assembly including an integrated circuit positioned on a board;

a housing enclosing said circuit assembly, said housing including a front wall and a back wall, said back wall having an interior surface facing integrated circuits on said circuit assembly and an exterior surface being an exterior surface of said device, said back wall having a perimeter, said housing having an opening on one end thereof for sliding receipt of a card with information stored therein between said circuit assembly and said interior surface of said back wall, and said back wall including a slot extending therethrough, said slot spaced from said perimeter of said back wall;

a card reader element positioned on said circuit assembly, said card reader element facing said interior surface of said back wall and to communicate the information from the card to said integrated circuits; and an ejection mechanism movingly carried on said back wall of said second housing section, said ejection mechanism including a resilient spring inside said interior surface of said back wall and a button [on] outside said exterior surface of said back wall, said button and resilient spring connected through said slot on said back wall to permit sliding movement of said ejection mechanism thereon, said resilient spring extending outwardly toward said card reader element to push the card against said card reader element.

2. The communication device as defined in claim 1, wherein said ejection mechanism further includes a stop member to abut the card and to push the card to slide out of said opening when said ejection mechanism is moved on said housing.

3. The communication device as defined in claim 1, wherein said ejection mechanism includes a clip, and said clip includes said resilient spring.

4. The communication device as defined in claim 3, wherein said back wall includes a recess around said slot and said button is positioned in and slides within said recess.

5. The communication device as defined in claim 3, wherein said circuit assembly includes a circuit board, wherein said card reader element and said integrated circuits are mounted on said circuit board.

6. A radiotelephone, comprising:
a radiotelephone housing, said radiotelephone housing having a front wall, side walls, a back wall opposite said front wall, and a bottom wall, said bottom wall including an opening, said opening for sliding receipt of a card having information stored therein, and said back wall including a hole extending through said back wall;
a circuit board positioned in said housing between said front wall and said back wall, said opening providing access to said interior of said housing between said circuit board and an inside surface of said back wall;
a user input on said front wall;
a card reader element positioned on said circuit board and facing said inside surface of said back wall, said card reader element to read the information from the card; and
an ejection mechanism mounted through said hole in said back wall, said ejection mechanism including a resilient spring positioned adjacent said inside surface of said back wall and extending outwardly toward said card reader element to push the card against said card reader element and a button on an exterior surface of said back wall for engagement by a user to push said eject mechanism to slide within said hole and push the card out of said opening.

7. The radiotelephone as defined in claim 6, wherein said ejection mechanism further includes a stop member to engage the card and to push the card when said ejection mechanism is slid on said housing.

8. The radiotelephone as defined in claim 7, wherein said stop member comprises an outwardly extending rib to abut with an edge of the card.

9. The radiotelephone as defined in claim 6, wherein said ejection mechanism includes a clip, said clip including said resilient spring.

10. The radiotelephone as defined in claim 9, wherein said back wall further comprises a recess and said button is positioned in said recess for sliding movement therein.

11. The radiotelephone as defined in claim 6, wherein said circuit board comprises a printed circuit board and said card reader element is mounted on said printed circuit board.

12. The radiotelephone as defined in claim 11, further including integrated circuits mounted on said circuit board, wherein said back wall and said integrated circuits form a card slot accessible through said opening.

13. A radiotelephone, comprising:
a radiotelephone housing, said radiotelephone housing having a front wall, side walls, top and bottom walls, a back wall opposite said front wall, and an opening in one of said top and bottom walls, said front wall having a display and a speaker positioned therein, and said opening for receipt of a card having information stored therein, said walls of said housing forming an enclosed volume;
a circuit board positioned in said radiotelephone housing enclosed volume between said front wall and said back wall of said housing, said circuit board having integrated circuitry positioned thereon, said opening providing sliding access for the card to be slid between said circuit board and said back wall when inserted through said opening in said one of said top and bottom walls;
a card reader element mounted on said circuit board with said integrated circuits, said card reader element to read information from the card and electrically coupled to said integrated circuitry to communicate the information from the card to said integrated circuitry; and
an ejection mechanism movably mounted on said back wall, said ejection mechanism including a resilient spring extending outwardly toward said card reader element to push the card against said card reader element and a button on an outside surface of said back wall, said resilient spring and button connected through said slot such that said eject mechanism slides in said slot when actuated by a user to eject the card by sliding it through said opening in said one of said top and bottom walls.

14. The radiotelephone as defined in claim 13, wherein the card is received between said circuit board and said back wall, and said ejection mechanism includes a guide to direct the card away from said back wall to prevent the card from becoming lodged between said ejection mechanism and said back wall.

* * * * *